United States Patent
Chen

(10) Patent No.: US 7,024,928 B1
(45) Date of Patent: Apr. 11, 2006

(54) MULTIFUNCTIONAL TIRE PRESSURE GAUGE

(76) Inventor: Jui-Yu Chen, 58, Ma Yuan West St., Taichung (TW)

( * ) Notice: Subject to any disclaimer, the term of this patent is extended or adjusted under 35 U.S.C. 154(b) by 0 days.

(21) Appl. No.: 11/035,301

(22) Filed: Jan. 14, 2005

(51) Int. Cl.
*B60C 23/02* (2006.01)

(52) U.S. Cl. ..................... 73/146.8; 73/146.3
(58) Field of Classification Search ............... 73/146.8, 73/146.3
See application file for complete search history.

(56) References Cited

U.S. PATENT DOCUMENTS

| | | | | |
|---|---|---|---|---|
| 4,998,438 A | * | 3/1991 | Martin | 73/146.8 |
| 5,568,117 A | * | 10/1996 | Hsu | 340/321 |
| 6,722,193 B1 | * | 4/2004 | Conway | 73/146.8 |
| 6,773,132 B1 | * | 8/2004 | Gilligan et al. | 362/119 |
| 6,868,718 B1 | * | 3/2005 | Hui et al. | 73/146 |
| 6,901,792 B1 | * | 6/2005 | Petrucelli | 73/146 |

\* cited by examiner

*Primary Examiner*—Edward Lefkowitz
*Assistant Examiner*—George P Bonanto
(74) *Attorney, Agent, or Firm*—Alan D. Kamrath; Nikolai & Mersereau, P.A.

(57) ABSTRACT

A multifunctional tire pressure gauge for a car functions to measure the inner temperature of the car, the voltage of the car battery and the tire pressure of the tire. Thus, when the plug is inserted into the cigarette lighter of the car, the tire pressure gauge can be used to measure the temperature of the inside of the car and the voltage of the car battery simultaneously. In addition, after the plug is removed from the cigarette lighter, the tire pressure gauge functions as a portable tire pressure gauge.

17 Claims, 3 Drawing Sheets

MULTIFUNCTIONAL TIRE PRESSURE GAUGE

BACKGROUND OF THE INVENTION

1. Field of the Invention

The present invention relates to a tire pressure gauge, and more particularly to a multifunctional tire pressure gauge.

2. Description of the Related Art

A conventional tire pressure gauge in accordance with the prior art shown in FIGS. 4 and 5 comprises a main body 1, a measuring connector 11 mounted on a first side of the main body 1, a display 12 and a switch 13 mounted on a second side of the main body 1 respectively, an air pipe 110 mounted in the measuring connector 11 and having an inside formed with an air hole 111 and a front end provided with a pressing end 113, and a soft gasket 112 mounted on a periphery of the air pipe 110 and located beside the pressing end 113.

When the conventional tire pressure gauge is mounted on the air valve 20 of a tire 2, the pressing end 113 of the air pipe 110 presses the air nozzle 21 of the air valve 20 to move inward to drain the air from the air valve 20 of the tire 2 into the air hole 111 of the air pipe 110, so that the conventional tire pressure gauge can measure the tire pressure of the tire 2 by a sensor (not shown) mounted in the measuring connector 11. At this time, when the pressing end 113 of the air pipe 110 presses the air nozzle 21 of the air valve 20 to move inward, the gasket 112 is rested on the air nozzle 21 of the air valve 20 to provide an air-tight effect, thereby preventing the air from leaking outward.

However, the conventional tire pressure gauge only has a single function, thereby limiting the versatility of the tire pressure gauge. In addition, the tire pressure gauge is not used often, thereby causing inconvenience to a user in storage of the conventional tire pressure gauge.

SUMMARY OF THE INVENTION

In accordance with the present invention, there is provided a tire pressure gauge, comprising a housing; a circuit board mounted in the housing; an air pipe mounted on and extended from an end of the circuit board; a plug mounted on and protruded outward from a first end of the housing; a hollow positive pole press rod movably mounted on the air pipe and having a first end connected to a first side of the circuit board and a second end protruded outward from the plug; and a negative pole press rod movably mounted on the first end of the housing and having a first end connected to a second side of the circuit board and a second end protruded outward from the housing.

The primary objective of the present invention is to provide a multi functional tire pressure gauge that measures the inner temperature of the car, the voltage of the car battery and the tire pressure of the tire.

Another objective of the present invention is to provide a tire pressure gauge, wherein when the plug is inserted into the cigarette lighter of the car, the tire pressure gauge can be used to measure the temperature of the inside of the car and the voltage of the car battery of the car simultaneously.

A further objective of the present invention is to provide a tire pressure gauge, wherein after the plug is removed from the cigarette lighter of the car, the tire pressure gauge functions as a portable tire pressure gauge.

Further benefits and advantages of the present invention will become apparent after a careful reading of the detailed description with appropriate reference to the accompanying drawings.

DETAILED DESCRIPTION OF THE INVENTION

Figure 1:
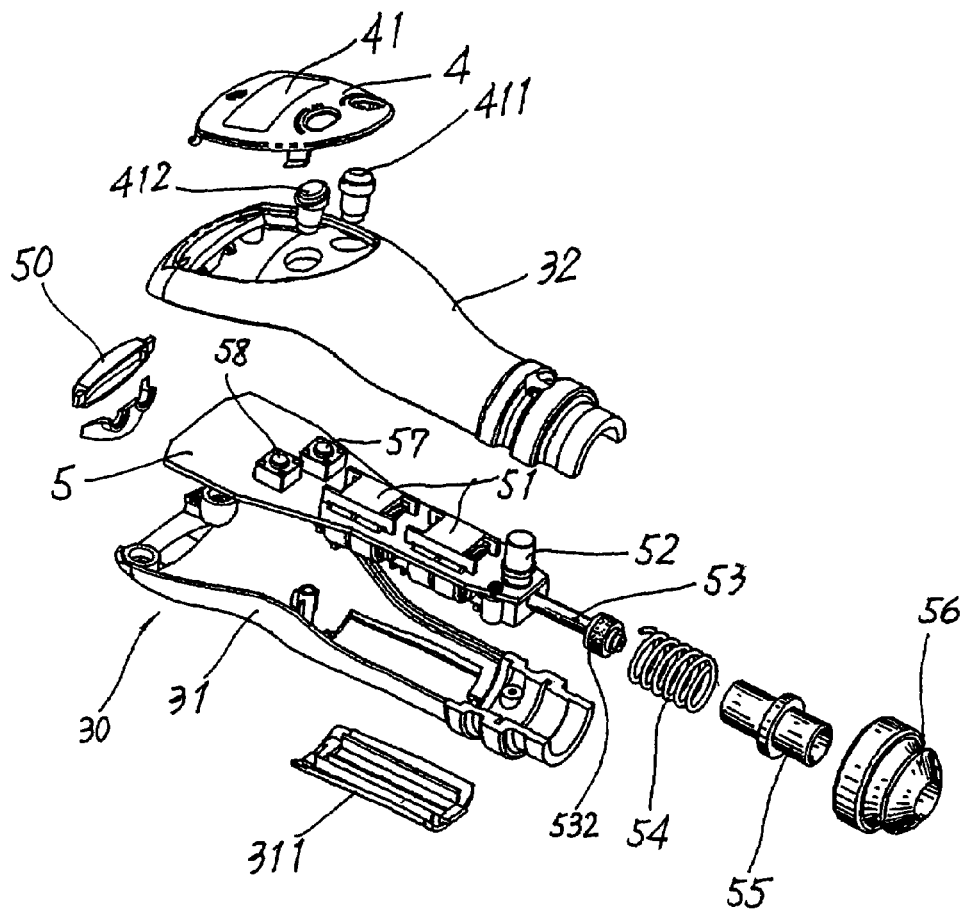
FIG. 1 is an exploded perspective view of a tire pressure gauge in accordance with the preferred embodiment of the present invention.
Figure 2:
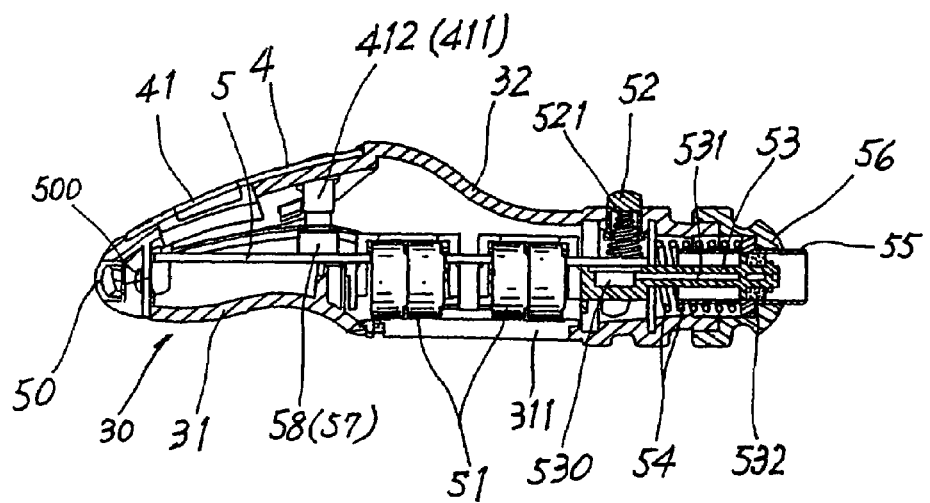
FIG. 2 is a plan cross-sectional assembly view of the tire pressure gauge as shown in FIG. 1.

Referring to the drawings and initially to FIGS. 1 and 2, a tire pressure gauge in accordance with the preferred embodiment of the present invention comprises a housing 30, a circuit board 5 mounted in the housing 30, an air pipe 53 (or measuring connector) mounted on and extended from an end of the circuit board 5, a plug 56 mounted on and protruded outward from a first end of the housing 30, a hollow positive pole press rod 55 movably mounted on the air pipe 53 and having a first end connected to a first side of the circuit board 5 and a second end protruded outward from the plug 56, a first elastic member 54 mounted on the positive pole press rod 55 and having a distal end connected to the first side of the circuit board 5, a negative pole press rod 52 movably mounted on the first end of the housing 30 and having a first end connected to a second side of the circuit board 5 and a second end protruded outward from the housing 30, a second elastic member 521 mounted on the negative pole press rod 52 and having a distal end connected to the second side of the circuit board 5, a face plate 4 mounted on the housing 30, a display 41 (such as an LCD display) mounted on the face plate 4, a function button 411 mounted on the face plate 4 and connected to a function button switch 57 of the circuit board 5, and a switching button 412 mounted on the face plate 4 and connected to a switching button switch 58 of the circuit board 5.

The housing 30 includes an upper cover 32 and a lower cover 31 combined with the upper cover 32. The face plate 4 is mounted on the upper cover 32 of the housing 30. A transparent side cover 50 is mounted on an opened second end of the housing 30 to cover the circuit board 5. Preferably, a lighting member 500 is mounted in the housing 30 and located beside the side cover 50 to provide an illuminating effect.

The circuit board 5 is provided with two battery seats 51. The lighting member 500 is connected to one of the two battery seats 51, and the face plate 4 is connected to the other one of the two battery seats 51. A battery cover 311 is mounted on an opened side of the housing 30 to cover the battery seats 51.

The air pipe 53 is mounted in a hollow inner wall of the positive pole press rod 55 and has an inside formed with an air hole 531. A soft gasket 532 is mounted on a periphery of the air pipe 53 and urged on the inner wall of the positive pole press rod 55 to provide an air tight effect. A detector 530 is mounted in the circuit board 5 as shown in FIG. 2.

The display 41 of the face plate 4 is used to indicate the detected tire pressure, voltage or temperature. The plug 56 is inserted into the cigarette lighter (not shown) of a car.

In operation, when the plug 56 is inserted into the cigarette lighter of the car, the positive pole press rod 55 is pressed inward to compress the first elastic member 54, and the negative pole press rod 52 is also pressed inward to compress the second elastic member 521.

At this time, the first elastic member 54 of the positive pole press rod 55 has a distal end connected to the first side of the circuit board 5, so that the positive pole press rod 55 connects the first side of the circuit board 5 to the positive pole of the car battery (not shown) of the car, while the second elastic member 521 of the negative pole press rod 52 has a distal end connected to the second side of the circuit board 5, so that the negative pole press rod 52 connects the second side of the circuit board 5 to the negative pole of the car battery of the car. Thus, the car battery of the car supplies an electric power to the circuit board 5 so as to supply an electric power to the face plate 4.

Figure 3:
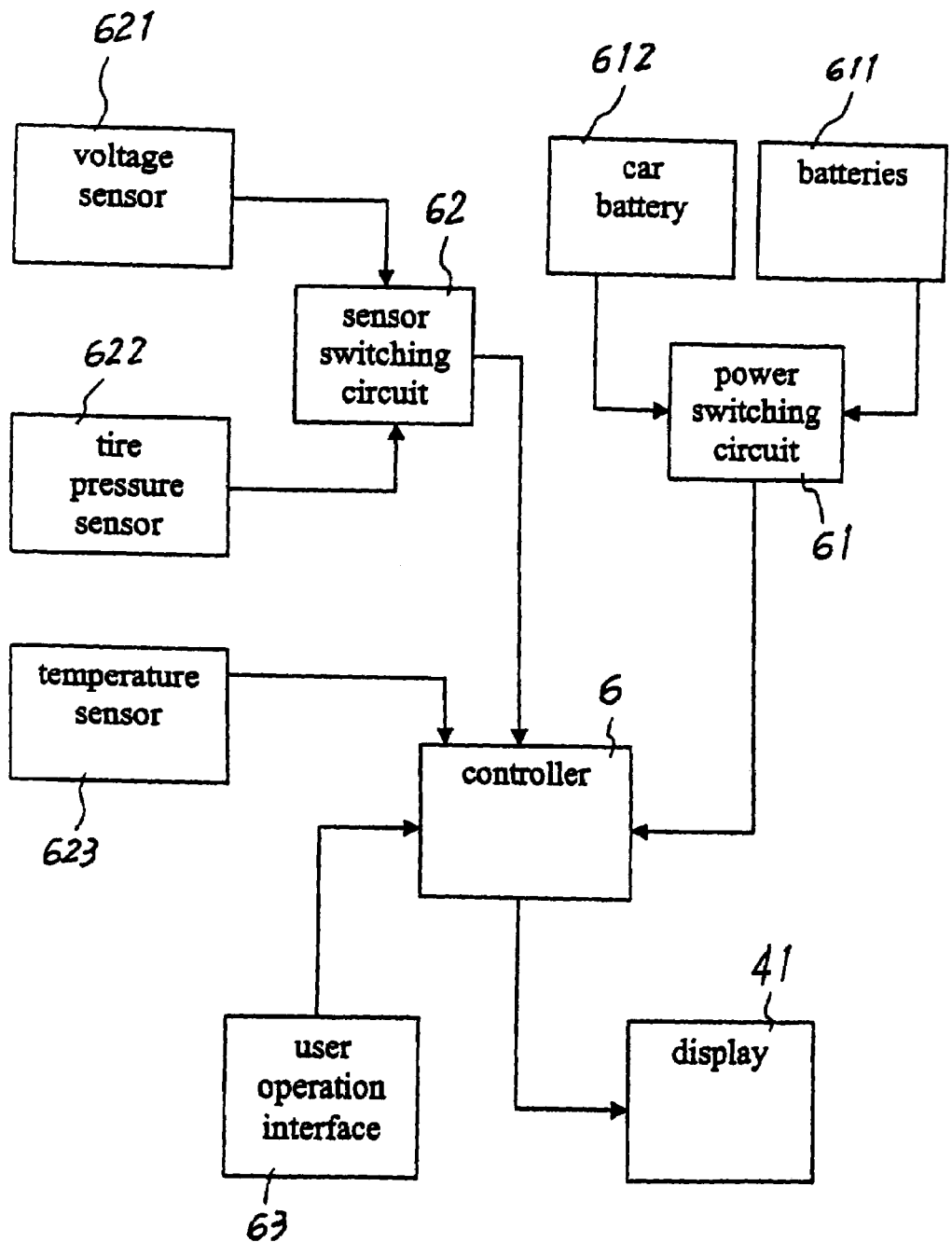
FIG. 3 is a block diagram of the tire pressure gauge as shown in FIG. 1.
Figure 4:
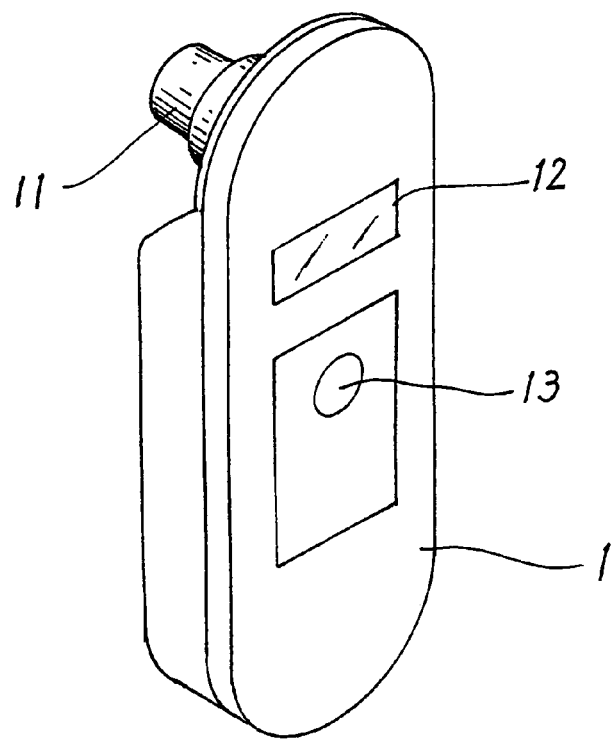
FIG. 4 is a perspective view of a conventional tire pressure gauge in accordance with the prior art.
Figure 5:
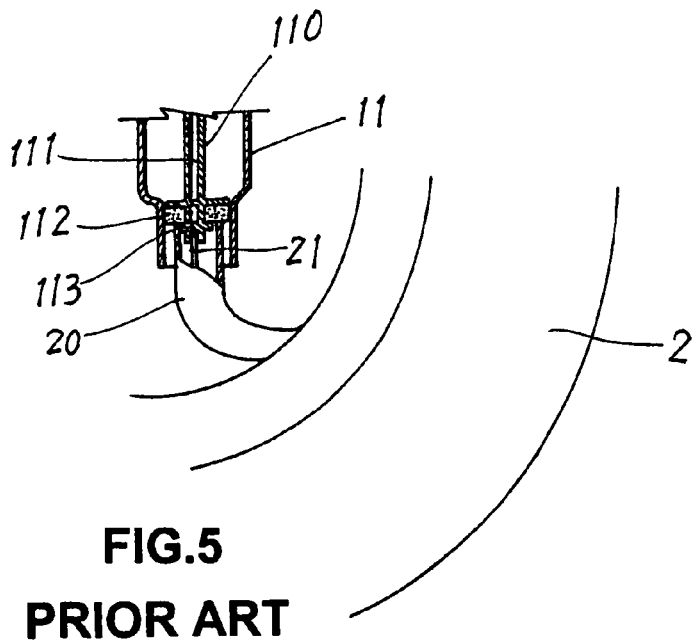
FIG. 5 is a partially cut-away plan cross-sectional view of the conventional tire pressure gauge as shown in FIG. 4.

Referring to FIG. 3, the circuit board 5 includes a controller 6, a power switching circuit 61 connected to the controller 6 and selectively connected to the car battery 612 (12V) of the car and batteries 611 (4.5V) mounted in the battery seats 51 to switch the power supply into the controller 6, a sensor switching circuit 62 connected to the controller 6, and a user operation interface 63 connected to the controller 6 and connected to the function button switch 57 and the switching button switch 58 to control operation of the display 41, the function button 411 and the switching button 412 of the face plate 4. The display 41 of the face plate 4 is connected to the controller 6 to indicate the detected values or operation values.

The detector 530 includes a voltage sensor 621 for detecting voltage values of the car battery 612 of the car and selectively connected to the sensor switching circuit 62 of the circuit board 5 so that the sensor switching circuit 62 is switched to supply detected voltage values of the car battery 612 of the car to the controller 6, a tire pressure sensor 622 connected to the air hole 531 of the air pipe 53 for detecting tire pressure values of the tire (not shown) of the car and selectively connected to the sensor switching circuit 62 of the circuit board 5 so that the sensor switching circuit 62 is switched to supply detected tire pressure values of the tire of the car to the controller 6, and a temperature sensor 623 connected to the controller 6 of the circuit board 5 to supply detected temperature values of the inside of the car to the controller 6. Thus, the controller 6 of the circuit board 5 has four functions including power supply, detection, operation and display functions.

When in use, referring to FIGS. 1–3, the plug 56 is directly inserted into the cigarette lighter of the car. At this time, the display 41 of the face plate 4 indicates the temperature value of the inside of the car detected by the temperature sensor 623.

If the user wishes to watch the voltage value of the car battery 612 of the car, he only needs to push the function button 411 of the face plate 4, so that the display 41 of the face plate 4 indicates the voltage value of the car battery 612 of the car. Then, the display 41 of the face plate 4 will return to the original state after a period of time (about ten seconds) to show the temperature value of the inside of the car. At this time, the car battery of the car supplies an electric power to the circuit board 5 so as to supply an electric power to the face plate 4.

Alternatively, after the plug 56 is removed from the cigarette lighter of the car, the tire pressure gauge functions as a portable tire pressure gauge. If the user wishes to measure the tire pressure of the tire of the car, he only needs to push the function button 411 of the face plate 4 to measure the tire pressure of the tire (the measuring method is conventional), so that the display 41 of the face plate 4 indicates the tire pressure value of the tire of the car. At this time, the batteries 611 mounted in the battery seats 51 supply an electric power to the circuit board 5 so as to supply an electric power to the face plate 4.

Accordingly, when the plug 56 is inserted into the cigarette lighter of the car, the tire pressure gauge can be used to measure the temperature of the inside of the car and the voltage of the car battery 612 of the car simultaneously. In addition, after the plug 56 is removed from the cigarette lighter of the car, the tire pressure gauge functions as a portable tire pressure gauge.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A tire pressure gauge, comprising:
   a housing;
   a circuit board mounted in the housing;
   an air pipe mounted on and extended from an end of the circuit board;
   a plug mounted on and protruded outward from a first end of the housing;
   a hollow positive pole press rod movably mounted on the air pipe and having a first end connected to a first side of the circuit board and a second end protruded outward from the plug;
   a negative pole press rod movably mounted on the first end of the housing and having a first end connected to a second side of the circuit board and a second end protruded outward from the housing.

2. The tire pressure gauge in accordance with claim 1, further comprising a first elastic member mounted on the positive pole press rod and having a distal end connected to the first side of the circuit board.

3. The tire pressure gauge in accordance with claim 1, further comprising a second elastic member mounted on the negative pole press rod and having a distal end connected to the second side of the circuit board.

4. The tire pressure gauge in accordance with claim 1, further comprising:
   a face plate mounted on the housing;
   a display mounted on the face plate;
   a function button mounted on the face plate and connected to a function button switch of the circuit board;
   a switching button mounted on the face plate and connected to a switching button switch of the circuit board.

5. The tire pressure gauge in accordance with claim 4, wherein the housing includes an upper cover and a lower cover combined with the upper cover, and the face plate is mounted on the upper cover of the housing.

6. The tire pressure gauge in accordance with claim 4, wherein the circuit board is provided with a battery seat connected to the face plate.

7. The tire pressure gauge in accordance with claim 6, further comprising a battery cover mounted on an opened side of the housing to cover the battery seat.

8. The tire pressure gauge in accordance with claim 1, further comprising:

a transparent side cover mounted on an opened second end of the housing to cover the circuit board;

a lighting member mounted in the housing and located beside the side cover to provide an illuminating effect.

9. The tire pressure gauge in accordance with claim 8, wherein the circuit board is provided with a battery seat connected to the lighting member.

10. The tire pressure gauge in accordance with claim 9, further comprising a battery cover mounted on an opened side of the housing to cover the battery seat.

11. The tire pressure gauge in accordance with claim 1, wherein the air pipe is mounted in a hollow inner wall of the positive pole press rod and has an inside formed with an air hole.

12. The tire pressure gauge in accordance with claim 11, further comprising a soft gasket mounted on a periphery of the air pipe and urged on the inner wall of the positive pole press rod to provide an air tight effect.

13. The tire pressure gauge in accordance with claim 4, wherein the circuit board includes:

a controller;

a power switching circuit connected to the controller and selectively connected to a car battery and a battery to switch a power supply into the controller;

a sensor switching circuit connected to the controller;

a user operation interface connected to the controller and connected to the function button switch and the switching button switch to control operation of the display, the function button and the switching button of the face plate.

14. The tire pressure gauge in accordance with claim 13, wherein the display of the face plate is connected to the controller.

15. The tire pressure gauge in accordance with claim 13, further comprising a detector mounted in the circuit board and including:

a voltage sensor selectively connected to the sensor switching circuit of the circuit board so that the sensor switching circuit is switched to supply detected voltage values from the voltage sensor to the controller;

a tire pressure sensor connected to the air pipe and selectively connected to the sensor switching circuit of the circuit board so that the sensor switching circuit is switched to supply detected tire pressure values from the tire pressure sensor to the controller;

a temperature sensor connected to the controller of the circuit board to supply detected temperature values to the controller.

16. The tire pressure gauge in accordance with claim 1, wherein when the plug is inserted into a cigarette lighter of a car, the tire pressure gauge can be used to measure the temperature of an inside of the car and the voltage of a car battery of the car simultaneously.

17. The tire pressure gauge in accordance with claim 1, wherein when the plug is removed from the cigarette lighter of the car, the tire pressure gauge functions as a portable tire pressure gauge.

* * * * *